(12) United States Patent
Paiva de Brito Sousa

(10) Patent No.: US 11,507,949 B2
(45) Date of Patent: Nov. 22, 2022

(54) POST-PAID PROCESS AND SYSTEM FOR MULTIPURPOSE DISCONNECTED TERMINALS

(71) Applicant: Rui Adriano Paiva de Brito Sousa, Coimbra (PT)

(72) Inventor: Rui Adriano Paiva de Brito Sousa, Coimbra (PT)

(*) Notice: Subject to any disclaimer, the term of this patent is extended or adjusted under 35 U.S.C. 154(b) by 226 days.

(21) Appl. No.: 17/049,686

(22) PCT Filed: Apr. 22, 2019

(86) PCT No.: PCT/IB2019/053303
§ 371 (c)(1),
(2) Date: Oct. 22, 2020

(87) PCT Pub. No.: WO2019/207458
PCT Pub. Date: Oct. 31, 2019

(65) Prior Publication Data
US 2021/0248601 A1    Aug. 12, 2021

(30) Foreign Application Priority Data

Apr. 22, 2018    (BR) .......................... 102018008143-8
Apr. 22, 2018    (PT) ......................................... 110704

(51) Int. Cl.
*G06Q 20/38*    (2012.01)
*G06Q 20/40*    (2012.01)

(52) U.S. Cl.
CPC ....... *G06Q 20/389* (2013.01); *G06Q 20/3825* (2013.01); *G06Q 20/3827* (2013.01);
(Continued)

(58) Field of Classification Search
CPC ........... G06Q 20/389; G06Q 20/38215; G06Q 20/3825; G06Q 20/3827; G06Q 20/3829;
(Continued)

(56) References Cited

U.S. PATENT DOCUMENTS

2016/0171479 A1* 6/2016 Prakash .............. H04L 63/0876
726/1

FOREIGN PATENT DOCUMENTS

CN    107423945 A  * 12/2017  ........... G06F 16/215

OTHER PUBLICATIONS

"Bitcoin and the Future of Digital Payments", Luther William, The Independent Review, 20.3:397-404 (Year: 2015).*
(Continued)

*Primary Examiner* — Jay Huang
*Assistant Examiner* — Duan Zhang
(74) *Attorney, Agent, or Firm* — Lucas & Mercanti, LLP

(57) ABSTRACT

This post-paid process and system for disconnected terminals solves the problem of a disconnected terminal being able to perform post-paid operations securely, using an electronic device of the user to communicate with a central server which creates a token with a temporal validity that serves to activate a compound of the disconnected terminal and, optionally, additional hardware. All operations performed in the terminal are locked to make it impossible to alter the data and signed with a cryptographic key before using the client device as transportation for the operations block to be processed in the central server and charged.

1 Claim, 10 Drawing Sheets

(52) U.S. Cl.
CPC ... *G06Q 20/3829* (2013.01); *G06Q 20/38215* (2013.01); *G06Q 20/401* (2013.01)

(58) Field of Classification Search
CPC .... G06Q 20/401; G06Q 20/06; G06Q 20/127; G06Q 20/14; G06Q 20/24
See application file for complete search history.

(56) References Cited

OTHER PUBLICATIONS

"Digital Assets on Public Blockchains", White Paper, XP055384342, 2016, pp. 1-37.Retrieved from the Internet: URL: http://bitfury.com/content/5-white-papers-research/bitfury-digital_assets_on_pub lie blockchains-1.pdf.

"Developer Guide—Bitcoin", XP055519712, 2015, pp. 1-48, Retrieved from the Internet: URL:https://web.archive.org/web/20150511232019/https://bitcoin.org/en/developer-guide.

International Search Report and Written Opinion for Corresponding International Application No. PCT/IB2019/053303 (Aug. 8, 2019) (13 Pages).

\* cited by examiner

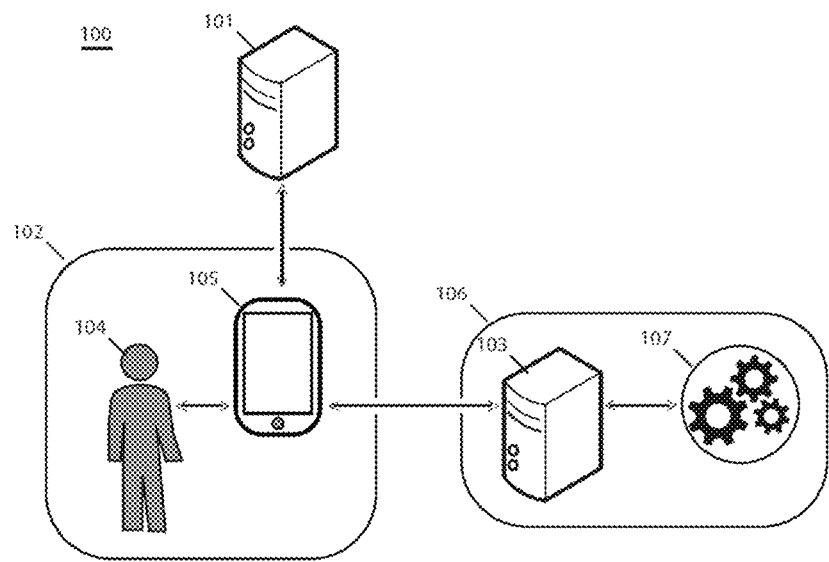
Fig. 1.1
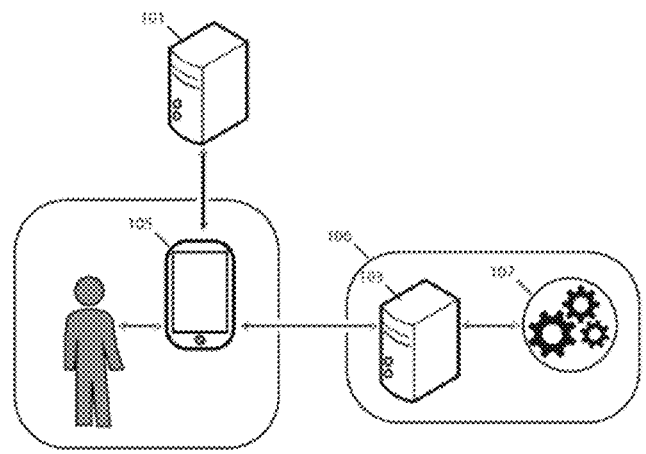
Fig. 1.1.1

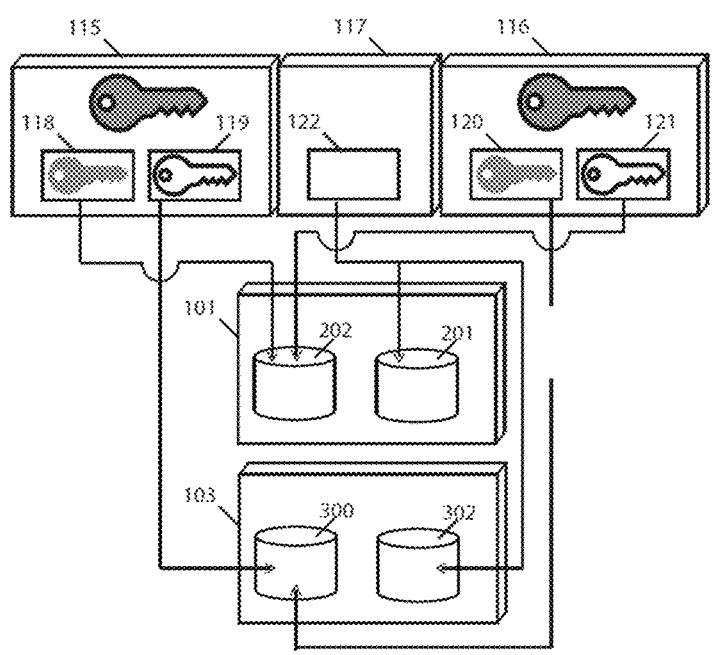
Fig. 1.2

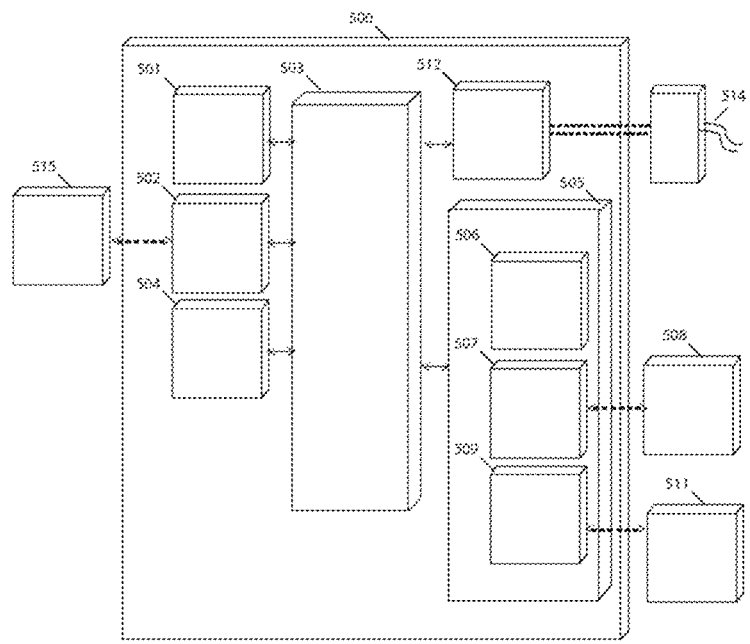
Fig. 5
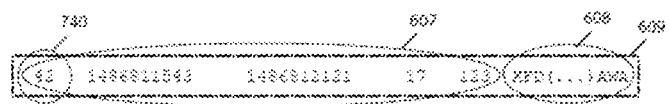
Fig. 6.1
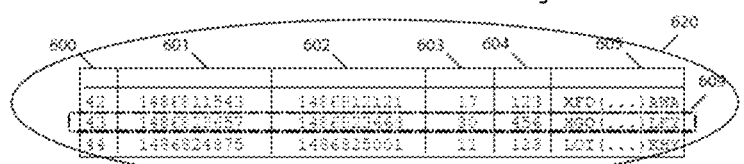
Fig. 6.2
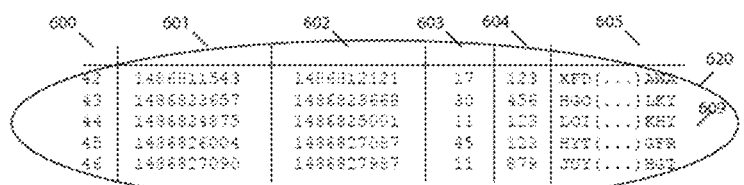
Fig. 6.3
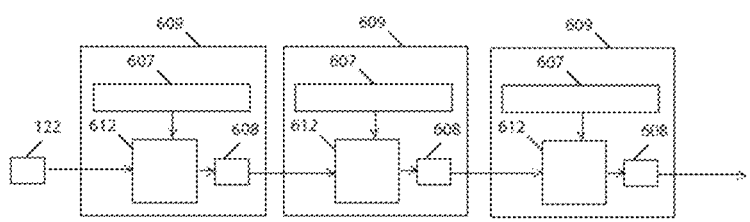
Fig. 6.4

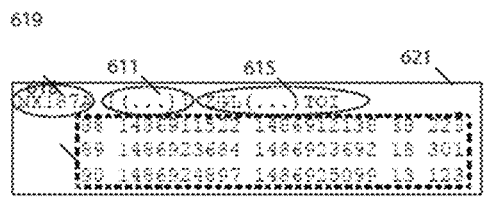
Fig. 6.5
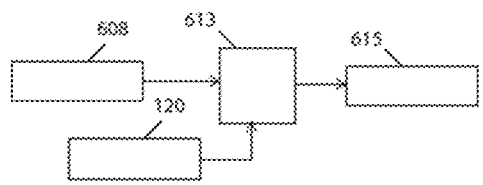
Fig. 6.6
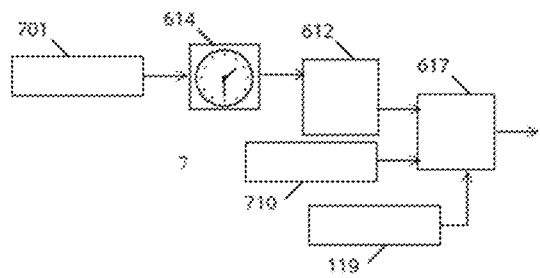
Fig. 6.7
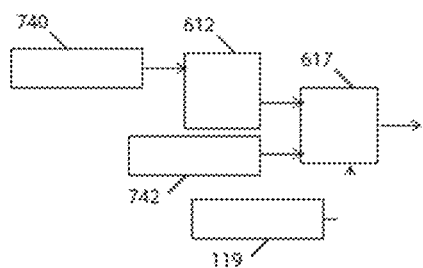
Fig. 6.8

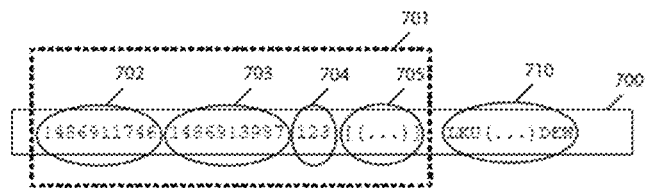
Fig. 7.1
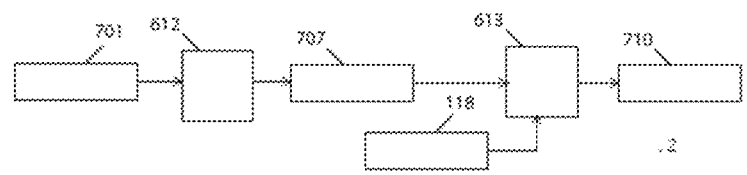
Fig. 7.2
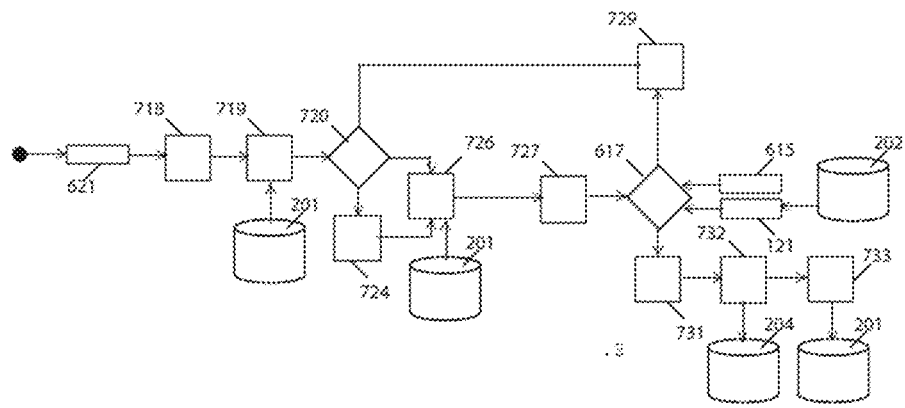
Fig. 7.3
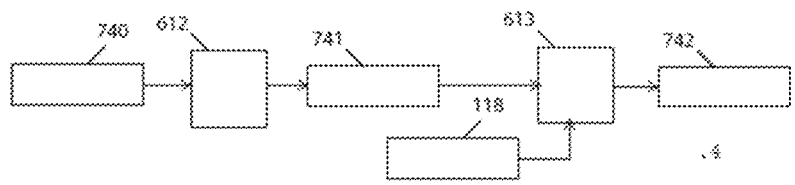
Fig. 7.4

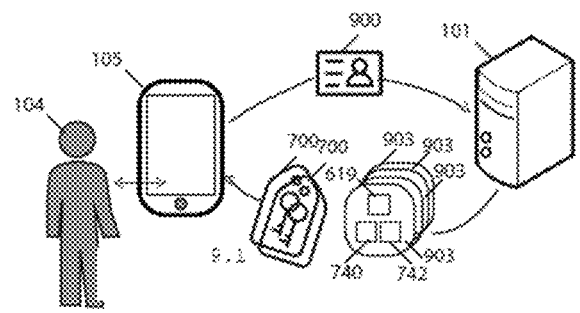
Fig. 9.1
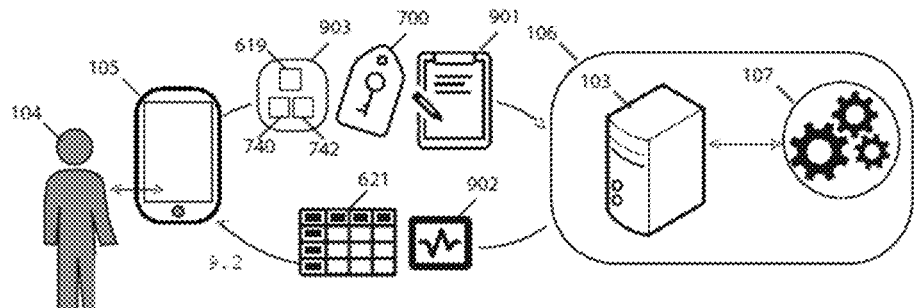
Fig. 9.2
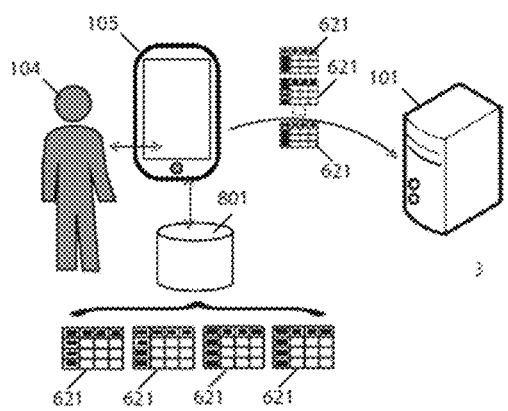
Fig. 9.3

POST-PAID PROCESS AND SYSTEM FOR MULTIPURPOSE DISCONNECTED TERMINALS

CROSS-REFERENCE TO RELATED APPLICATIONS

This application is a 371 of PCT/IB2019/053303, filed Apr. 22, 2019, which claims the benefit of Brazilian Patent Application No. BR 102018008143-8, filed Apr. 22, 2018 and Portuguese Patent Application No. 110704, filed Apr. 22, 2018, each of which are incorporated herein by reference.

TECHNICAL FIELD

This document refers to a disconnected terminal process and system for multipurpose post-paid payment with the aim of providing a new way to receive payments as a solution for smart cities.

There are many situations where consumers wish to perform a post-paid operation when acquiring a good or service. These range from situations where a consumer doesn't have money to make a payment at a given time to those where he prefers to pay all his costs/bills in a certain period of time for reasons of simplicity and practicality.

It is obvious that, if you pay your water or electricity bills in a post-paid manner, you are more vulnerable to the inconvenience of being cut off and having to pay for renewed access. However, there are many situations in the world today that could be simplified if there were a way to enable post-paid payment.

Post-paid payment also allows for more efficient management of resources, increased customer loyalty and stronger commercial provision from those who offer certain products/services. However, ensuring the acceptance of post-paid methods involves certain challenges.

BACKGROUND OF THE INVENTION

In the case of disconnected terminals, such as: water, electricity or gas meters, it is necessary for an employee of the supplier company to go to the site and carry out a reading thereof. This manual process may lead to errors, such as clear delays in data collection and in the billing process, the submission of estimated values and costs associated with the manual reading process.

In the case of connected terminals, where the equipment informs the level of consumption periodically or where consumption occurs, for example, through the payment of tolls via a device installed in the vehicle and antennas located on a road, PLC smart energy meters, etc., there is, firstly, an increased cost related to the data connection, which connection is prone to failures, and in many situations there may be no possibility for data connection, or, its use may not be economically feasible, which ultimately restricts the use of connected terminals in certain contexts, for example, when they are far from urban centers, or in the case of garages without data network signals, etc.

Another problem regarding the use of post-paid terminals is that they are usually associated with a specific location (as in the case of water or electricity) which is not diffuse. For example, post-paid terminals are not used on public transport or in paid parking lots, in a practical way, as the present invention intends.

The use of connected terminals also presents an extra challenge. If there is a failure in the communications network, they become inoperative.

So, a technical solution is required that allows post-paid operations to be made on unconnected terminals, but without the disadvantages of requiring manual data collection, a long waiting period between operation and billing, and security against fraud.

SUMMARY OF THE INVENTION

Procedure for performing operations on multipurpose disconnected terminals regarding post-paid payments, characterized by the fact: storage of user accounts in a database of a central server, a plurality of user accounts where each account has sufficient elements to identify the user unequivocally and to carry out the charge as well as to authenticate it in the system; storage of cryptographic keys in a central server database, a plurality of keys used to sign and/or validate messages exchanged between the central server and disconnected terminals via the user's electronic device; storing of cryptographic keys in a database of a disconnected terminal, a plurality of keys used to sign and/or validate messages exchanged between the central server and disconnected terminals; storage of a list of disconnected terminals on the central server, in a data structure that identifies at least, for each terminal, a unique identification code, a public key (or a reference to such), a genesis hash, and identification of the last operation received, validated and processed by the central server and that was generated in the disconnected terminal, as well as the respective hash of this operation, and which may include other elements in accordance with the business logic that you wish to implement in the materialization of this invention; storage of a record of operations performed on disconnected terminals on the central server, where the record of operations performed includes, in its data structure, at least the identification (or reference) of the disconnected terminal, identification (or reference which allows for the identification) of the user and/or token used, and date and time of the operation performed on the disconnected terminal, which may contain other elements in accordance with the business logic that you wish to implement, for example, duration, quantity acquired/used, among others; generating a token, through a token generating module on the central server; the token consists of at least the unique identifier code, a temporal validity, and a cryptographic signature; storage of the tokens generated on the central server in a database on the central server, in a data structure that, in addition to the elements already indicated for the token, has at least one field that allows the token to be unequivocally associated with a specific user; storage of a record of the operations performed on the disconnected terminal, where the record of operations performed includes, in its data structure, at least the identification (or reference which allows for the identification) of the user and/or token used, and the date and time of operation performed on the disconnected terminal and an index field (organized chronologically, which may comprise, for example, without being limited to, numbering from 1, 2, 3, . . . , n, Unix time, etc.), and may also contain other elements depending on use, such as duration, quantity acquired/used, among others; generating a hash for each operation performed on the disconnected terminal by the disconnected terminal where the hash is computed using, as input data, the elements that compose the operation (values) plus the value of the hash computed in the immediately preceding operation, creating a structure of chained hashes of operations (where, in the first operation, in the absence of the hash from the previous operation, a genesis hash value previously configured in the disconnected terminal is used and which is also registered on the central server); validating, through a block validation module on the central server, blocks containing in their structure at least one operation performed on a disconnected terminal (where more than one are organized chronologically), identification of the disconnected terminal and validation signature generated by the disconnected terminal to validate the block; queuing, through a queue module on the central server, all the blocks received from users (through their electronic devices) to be validated by the validation module; validating, through a token-validation module in the disconnected terminal, the token generated on the central server, verifying whether the expiry date is still valid and whether the signature generated is valid; generating, through an index generation module on the central server, an index that informs the disconnected terminal which operation performed on it has been received, validated and processed on the central server, an index that has in its data structure, at least, the disconnected terminal identifier, a single (preferably chronological) identifier of the operation already received, validated and processed, and a cryptographic signature that validates the identifier; validating, through an index validation module in the disconnected terminal, the index, generated on the central server, which informs the disconnected terminal which operation performed on it has been received, validated and processed by the central server; generating, through a block generation module in the disconnected terminal, a block of operations that have not yet been received, validated and processed by the central server (which is to say, whose index value is greater than the index value of the operation that the disconnected terminal recognizes as having been received, validated and processed by the central server), which block contains at least, in its structure, the identification of the disconnected terminal, at least one operation performed on the disconnected terminal and which is not known to the disconnected terminal that has been validated by the central server and validation signature generated by the disconnected terminal to validate the block, where the operations are organized chronologically (from the oldest to the most recent execution) where the hash values of each operation can be omitted; storing, on the user's electronic device, tokens generated on the central server for use in the disconnected terminals; storing, in the user's electronic device, indices generated on the central server of the operations of the disconnected terminals that have already been received, validated and processed on the central server, so that these indices can be sent to the disconnected terminals; storing, on the user's electronic device, the blocks of operations generated by the disconnected terminals to be sent to the central server for processing and validation; execution of a function by the disconnected terminal through the control and command module, in response to a message sent by the user through its respective electronic device and after the validation of the token mandatorily sent; establishing an electronic connection via one or more data networks between the user's electronic device and the central server; establishing an electronic connection via one or more data networks between the user's electronic device and the disconnected terminal.

BRIEF DESCRIPTION OF THE DRAWINGS

To facilitate the understanding of this application, figures are attached representing preferential realizations which, however, are not intended to limit the technique hereby revealed.

FIGS. 1.1 and 1.1.1, is a block diagram which illustrates an example of the architecture of the post-paid process and system for multipurpose disconnected terminals, in accordance with the exemplifying embodiments.

FIG. 1.2 is a block diagram that illustrates the process of distributing the initializing keys and hashes between two components of the post-paid process and system for multipurpose disconnected terminals.

FIG. 5, is a block diagram which illustrates the architecture of a computer system in accordance with exemplifying embodiments.

FIG. 6.1 illustrates an operation in accordance with exemplifying embodiments.

FIGS. 6.2 and 6.3, illustrate a table of operations of the disconnected terminal in accordance with the exemplifying embodiments.

FIG. 6.4 illustrates a flow chart of the operations chaining process in accordance with the exemplifying embodiments.

FIG. 6.5 illustrates a block of operations formatted to be sent from the disconnected terminal to the central server in accordance with the exemplifying embodiments.

FIG. 6.6 illustrates a flow chart of the signature process of a block hash by the disconnected terminal in accordance with the exemplifying embodiments.

FIG. 6.7 illustrates a flow chart of the process of verifying the validity of a token by the disconnected terminal in accordance with the exemplifying embodiments.

FIG. 6.8 illustrates a flow chart of the validity verification process of an index by the disconnected terminal in accordance with exemplifying embodiments.

FIG. 7.1 illustrates the elements of a token in accordance with exemplifying embodiments.

FIG. 7.2 illustrates a flow chart of the signing of tokens by the central server in accordance with exemplifying embodiments.

FIG. 7.3 illustrates a flow chart of the processing of a block of operations generated by the disconnected terminal by the central server in accordance with exemplifying embodiments.

FIG. 7.4 illustrates a flow chart of the signing of indices by the central server in accordance with exemplifying embodiments.

FIGS. 9.1, 9.2 and 9.3, are flow charts illustrating the post-paid process and system for multipurpose disconnected terminals, using the system presented in FIG. 1.1, in accordance with exemplifying embodiments.

DETAILED DESCRIPTION OF THE INVENTION

Figure 2:
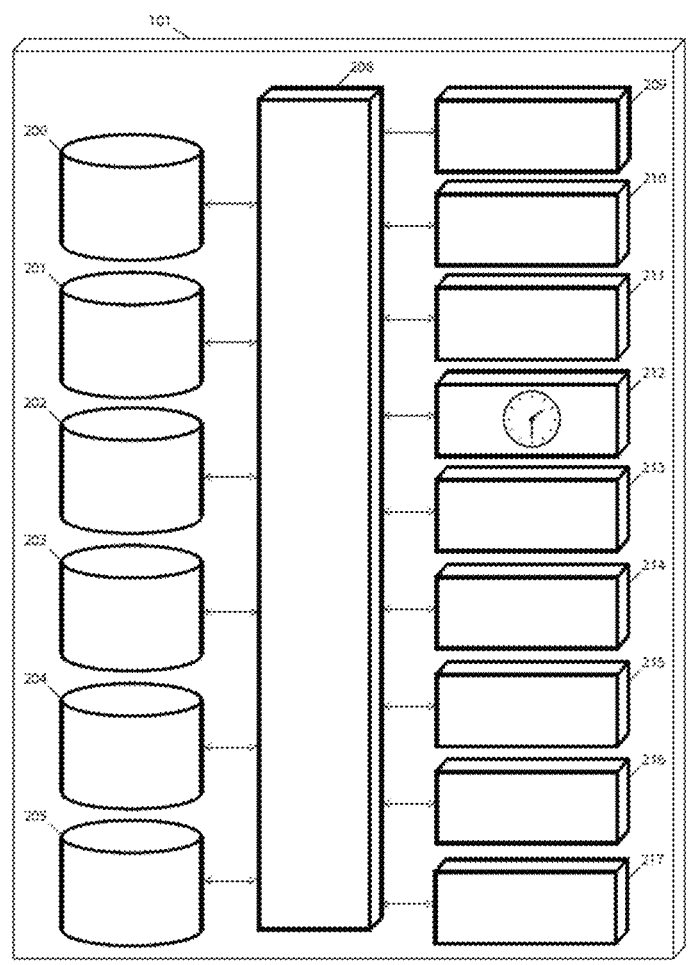
FIG. 2, is a block diagram which illustrates the central server, also presented in FIG. 1.1, in accordance with exemplifying embodiments.

With reference to the figures, some embodiments are now described in more detail, which are not intended to limit the scope of this application.

FIGS. 1.1 and FIG. 1.1.1 illustrate the post-paid system (100) for multipurpose disconnected terminals, where the operations performed on the disconnected terminals can be transferred to the users' electronic devices and from there to the central server.

The system (100), may include a central server (101). The central server, (101), discussed in greater detail below, may be configured to generate credentials such that the user (104), through a device (105), is able to perform operations by a given solution (106) intended to offer a post-paid payment solution. This solution may include a disconnected terminal (103) in the form of a computer system and additional hardware (107) that can perform an action (liberating access, calculating consumption over a certain period of time, calculating consumption between an activation/deactivation order on the part of the user (104) that executes them through the device (105), [such as] the sale of items, the rental of items, etc.).

The basis of the system operates through communication between the central server (101) and the disconnected terminal (103) using the resources (102) of each user (104) of the system. To this end, the electronic device (105) of the user (104) can establish an electronic connection via a data network with the central server (101) and can use, for this purpose, any data network available to the electronic device (105), which allows communication between the electronic device (105) and the central server (101). Similarly, a second electronic data connection between the customer's electronic device (105) and the disconnected terminal (103) can be realized. Unlike the first connection, this connection can use communications technologies in proximity data networks, for example Wi-Fi, Bluetooth, ZigBee, and NFC, among others, but not limited to such, since the disconnected terminal (103) can generate a proximity data network such that the user (104) must be in proximity to the disconnected terminal (103) to connect to it.

All communications performed on this system (100) use cryptographic keys, which keys (115), (116), are formed of a pair of a public key (119), (121) and a private key (118), (120). For additional security, in the creation of the blocks (620) of operations (609), which will be described in more detail below, a genesis hash is used (122) which may be individual for each disconnected terminal (103). The central server (101) may have in its databases (202), (201), a private key of the server, the genesis hash (122) of the terminal (103) and the public key of the terminal (121). Each terminal may have in its databases (300), (302), the public key of the server (119), the genesis hash (122) and its own private key (120) which may be individual.

FIG. 2 illustrates an embodiment of the central server (101) of the system (100). The realization of the central server will be obvious to persons skilled in the art (101), and FIG. 2 is provided merely for illustrative purposes and may not be exhaustive for all the configurative possibilities of the central server (101) sufficient to perform the functions as presented here. The model of the computer represented in FIG. 5, and presented in greater detail below, may offer a more adequate presentation of the central server (101).

The central server (101) may have a receiving unit (209). This receiving unit (209) can be configured to receive data over one or more data networks and through one or more network protocols. In some configurations the receiving unit (209) may be composed of multiple units, from different units, for example, to receive data from different networks. The receiving unit (209) may be configured to receive electronic data from the electronic devices (105) of users (102), through a protocol.

The central server (101) may also include a communication module (208), which communication module can be configured to transmit data between the modules, engines, databases, memories and other components of the central server (101) in order to perform the inherent functions hereby discussed. The communication module (208) may consist of one or more types of communication and may use various methods of communication with computing devices. For example, the communication module (208), may comprise a bus, pin connector, wires, etc. In some materializations the communication module (208) may be configured for communication between internal and external components of the central server (101). The central server (101) may include a processing unit. The processing unit may be configured to perform functions inherent to the central server (101), which will be obvious to an expert. In some embodiments, the processing device may include and/or comprise a plurality of components and/or modules specially configured to perform one or more activities/functions of the equipment, for example, a token generation module (211), a clock module (212), a cryptography module (213), an index generation module (214), a block validation module (215), a queue module (216), an authentication module (217), etc. As used here, the term "module" may mean software, hardware or a mixture of both, specifically programmed to receive a data input, to perform one or several processes using the data received, and may collect more data from the other components of the system, and provide a data output. The input, output and processes executed by the various modules will be easy to understand and implement by an expert based on this document.

The central server (101), may include a database: users (200), disconnected terminals (201), cryptographic keys (202), generated tokens (203) and operations received (204) are created in a suitable data storage format and schema. These databases (200-204) may be relational or non-relational databases (which use a query language for all the processes of reading, searching, adding, modification, updating, access, storage, etc.), sets of data structures stored in volatile or non-volatile memory, a cloud data structure, etc. The user database (200) may be configured to save a plurality of data that allows users (104) to be identified unequivocally. The terminal database (201) may be configured to save a data structure that contains, at a minimum, for each disconnected terminal (103) a unique identification code, the genesis hash (122), a public key (121), the code of the last operation (600) and the respective hash (608) operation and the respective hash received and validated by the central server (101)). The cryptographic key database (202) can be configured to save a data structure that contains at least one unique identification code for each key, usage type (of the central server (101) for signing or of the disconnected terminal (103) for validation), key type (if public, private or both), an identification that allows for the identification of the disconnected terminal (103) or the central server (101) which is its possessor and respective cryptographic key (set of characters in computer format) itself. The token database (203) may be configured to save a data structure that contains at least one unique identification code for each token (700), a date and time of issue, a validity date and time, an identification code (or reference that allows for the identification) of the user (104) to whom the token was issued (700) and respective validation signature (710) using one of the cryptographic keys from the central server (101) in order to validate the same. The operations database (204) may be configured to save a data structure that contains at least one unique identification code for each operation, an identification code of the disconnected terminal where the operation was performed, an identification code (or reference that allows for the identification) of the user (104) who performed the operation and/or of the token (700) used to perform the operation, the date and time the operation took place, where, depending on the specific task required of the system (106), it is possible to add other elements such as duration (usage time), units acquired/consumed, among other data which may be collected by the disconnected terminals (103) and sent to the central server (101) for subsequent billing.

The central server (101) may have a transmission unit (210). This transmission unit (210) may be configured to receive data over one or more data networks and through one or more network protocols. In some configurations the transmission unit (210) may consist of multiple units, from different units, for example to receive data from different networks. The transmission unit (210) can be configured to receive electronic data from electronic devices (105) of users (102), through a protocol.

Figure 3:
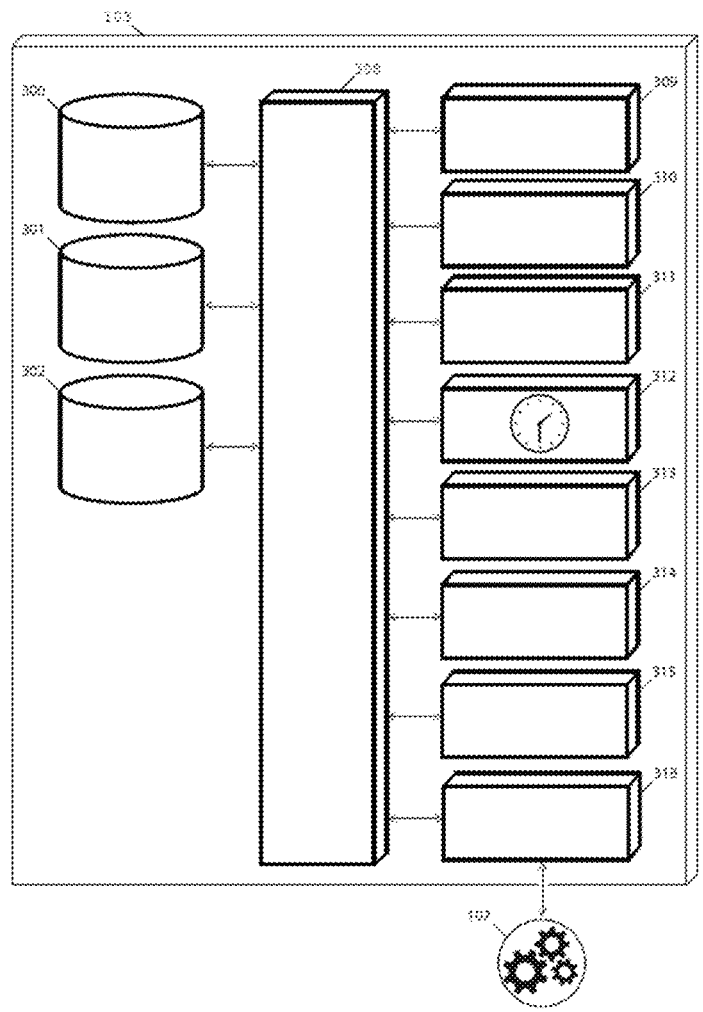
FIG. 3, is a block diagram which illustrates the disconnected terminal, also shown in FIG. 1.1, in accordance with exemplifying embodiments.

FIG. 3 illustrates an embodiment of the disconnected terminal (103) of the system (100). The realization of the central server will be obvious to persons skilled in the art (103), and FIG. 3 is provided merely for illustrative purposes and may not be exhaustive for all the configurative possibilities of the disconnected terminal (103) sufficient to perform the functions as presented here. The computer model represented in FIG. 5, and presented in greater detail below, may offer a more adequate presentation of the disconnected terminal (103).

The disconnected terminal (103) may have a receiving unit (309). This receiving unit (309) may be configured to receive data over one or more data networks and through one or more network protocols. In some configurations the receiving unit (309) may be composed of different and multiple units, for example to receive data from different networks. The receiving unit (309) may be configured to receive electronic data from the electronic devices (105) of users (102), through a protocol.

The disconnected terminal (103) may also include a communication module (308), where the communication module can be configured to transmit data between modules, engines, databases, memories and other disconnected terminal components (103) in order to perform the inherent functions hereby discussed. The communication module (308) may consist of one or more types of communication and may use various methods of communication with computing devices. For example, the communication module (308) may comprise a bus, pin connector, wires, etc. In some materializations the communication module (308) may be configured for communication between internal and external components of the disconnected terminal (103). The disconnected terminal (103) may include a processing unit. The processing unit may be configured to perform functions inherent to the disconnected terminal (103), which will be obvious to an expert. In some embodiments, the processing device may include and/or comprise a plurality of components and/or modules specially configured to perform one or more activities/functions of the equipment, for example, a token validation module (311), a clock module (312), an encryption module (314), a block generation module (313), an index validation module (315), a control and command module (318), etc. As used here, the term "module" may refer to software, hardware or a mixture of both specifically programmed to receive a data input, perform one or several processes using the data received, and may collect more data from the other components of the system and provide a data output. The input, output and processes executed by the various modules will be easy to understand and implement by an expert based on this document.

The disconnected terminal (103) may include a database of: cryptographic keys (300) and operations (301) that are created in an appropriate format and data storage schema. These databases (300) and (301) may be relational or non-relational databases (which use a query language for all processes of reading, searching, adding, modifying, updating, accessing, saving, etc.), sets of data structures stored in volatile or non-volatile memory, cloud data structures, etc. The cryptographic key database (300) may be configured to save a data structure that contains at least one unique identification code for each key, usage type (from the central server (101) for validation or from the disconnected terminal (103) for signing), key type (if public, private, or both), an identification that allows for the identification of the central server (101) issuer, where the "terminal" type key belongs to the respective disconnected terminal (103) itself. The operations database (301) may be configured to save a data structure that contains at least one unique identification code for each operation, an identification code (or reference that allows for the identification) of the user (104) who performed the operation and/or the token (700) used to perform the operation, the date and time that the operation occurred, where, depending on the specific task required of the system (106), it is possible to add other elements such as duration (time of use), units acquired/consumed, among other data that can be collected by the disconnected terminals (103) and sent to the central server (101) for subsequent billing.

The disconnected terminal (103) may possess a transmission unit (310). This transmission unit (310) may be configured to receive data over one or more data networks and through one or more network protocols. In some configurations the transmission unit (310) may consist of multiple, different units, for example to receive data from different networks. The transmission unit (310) may be configured to receive electronic data from the electronic devices (105) of users (102), through a protocol. The disconnected terminal (103) has a memory (302) where the genesis block (122) can be stored. The control and command module (318) of the disconnected terminal (103) allows the disconnected terminal (103) to control and communicate with additional hardware (107) which may perform a periodic or continuous action, collect data, send data, etc., depending on the specific realization for which the system is intended (106) where the disconnected terminal (103) is inserted, for example, but not limited to, allowing access, calculating consumption, calculating time, supplying a product, supplying item units, etc., where said calculation may be periodic or continuous with activation during a period of time or until the user (104) performs an action through the electronic device (105) that causes the stoppage, when the data from said usage/operation (609) (periodic or continuous) are inserted into a block (620) for subsequent sending to the central server (101) through a formatted block (621) of operations (609).

Figure 4:
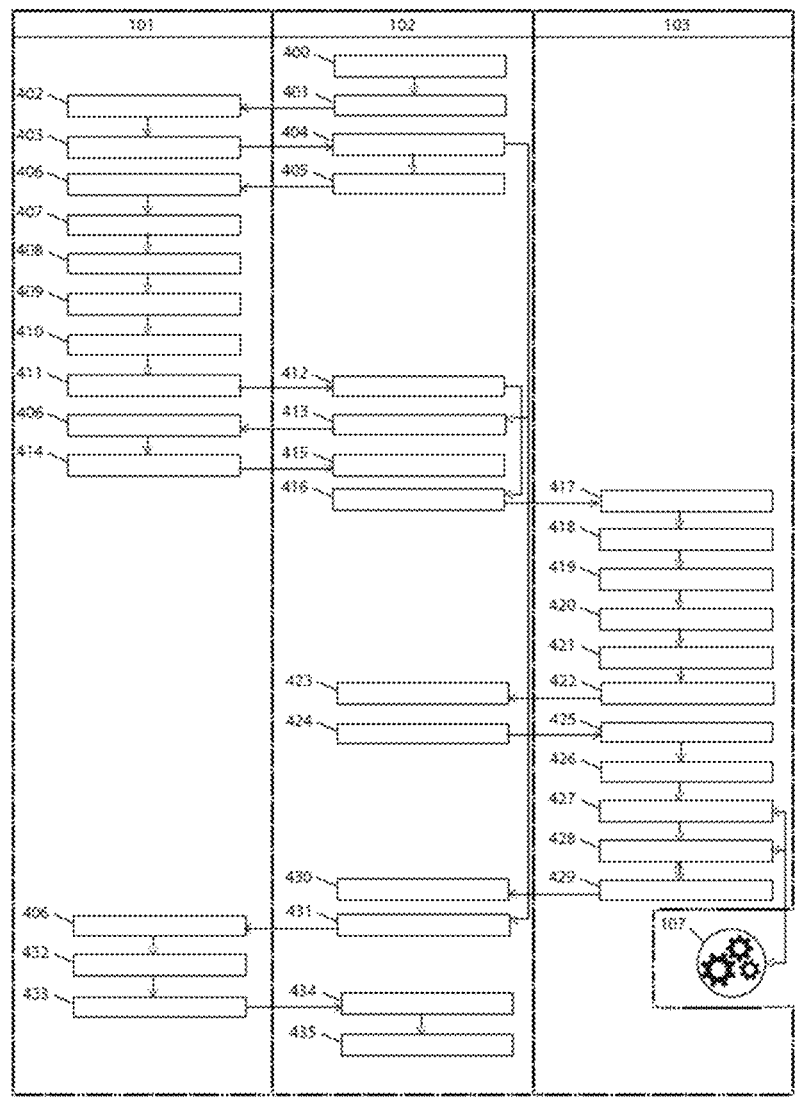
FIG. 4, is a flow chart which illustrates the post-paid process and system for multipurpose disconnected terminals, using the system presented in FIG. 1.1, in accordance with exemplifying embodiments.

FIG. 4 illustrates a flow chart of the post-paid process for multipurpose disconnected terminals. In step (400) the electronic device (105) of the user (104) may receive a user data input (104) and may perform the authentication on the central server (101). In step (401) the electronic device (105) of the user (104) can perform the authentication on the central server (101). In step (402) the central server (101) can receive the authentication request from the electronic device (105) of the user (104) and validate the data by creating a session (403) and sending the session data to the electronic device (105) of the user (104) which stores the session (404) in its internal memory (803). Although the other elements below are described using the session process, there is nothing to prevent this from being used instead of the submission of credentials (typically a login and password) in all the operations with the server, which is another possible realization, so both the use of the session and the submission of credentials are considered as authentication (900) of the customer (104) through the electronic device (105) in the central server (101). In step (405), the electronic device (105) of the user (104) requests the generation of a token (700). In step (406) the central server (101), on receiving the request (step 405) verifies the authentication (900), proceeding to step (407) where it collects the current date/time, proceeding to step (408) where it creates the token by computer means (700), proceeding to step (409) where a token validation signature is generated (700) using a private key (118) from the central server (101), proceeding to step (410) where the token (700) is saved in the token database (203) of the central server (101) and proceeding to step (411) where the central server (101) sends the token (700) to the electronic device (105) of the user (104). On receiving the token, step (412), the electronic device (105) of the user (104) saves the token in the token database (800). If the token (700) is generated to be used in a specific disconnected terminal (103), the latter may include in its elements an indication of the code of the operation already received, validated and processed by the central server (101): the index (740), but in a more typical realization, a list containing the identification (619) of the disconnected terminal (103), the index of the last operation received, validated and processed (740), and the respective validation signature (742) should be collected by the electronic device (105) of the user (104) of the central server (101), as per step (413), where the electronic device (105) of the user (104) sends the session (900) and requests the list of disconnected terminals (103) with their identification code (619) of the disconnected terminal (103) and respective indices (740) and validation signature (742). The central server (101) (step (406), on receiving the request (step (413)) verifies the authentication (900), and proceeds to step (414) where a recent list of disconnected terminals (103) and the respective identification code (619) of the disconnected terminal (103), indices (740) and validation signature is made (742), and sent back to the electronic device (105) of the user (104), which, in step (415), saves it to the database (802). In step (416) the "handshake" of the electronic device (105) of the user (104) and the disconnected terminal (103) is illustrated; in this case the electronic device (105) of the user (104) connects to the disconnected terminal (103) and sends the token (700) collected from the central server (101) and the index data (903) (identification code (619)) of the disconnected terminal (103), the identification of the last operation received/validated/processed (740) by the central server (101) and the respective validation signature (742)), and optionally an instruction (901). The disconnected terminal (103), in turn, receives the request (step (417)), checks the current date/time (step (418)), validates the token (700) sent by the electronic device (105) of the user (104) (Step (419)), validates the index data (903) (Step (420)), proceeding to step (421) where the disconnected terminal (103) updates, in its memory (302), the index value and optionally removes the operations that were received and confirmed by the central server (101) (through the index) of the operations database (301). In step (422) the disconnected terminal (301) sends to the electronic device (105) of the user (104) all the operations (620) created after the operation (609) confirmed by the central server (101) using the index data (903). This submission of information about operations is done through a formatted block (621) of operations (609) which will be presented in more detail below. The electronic device (105) of the user (104) receives the formatted block (621) of operations (609) and saves it in the database (801) for subsequent sending to the central server (101) (Step (423)). The sending of the operations block may have some rules. For example, there may be a minimum of accumulated operations that can be sent, such as 1, 2, 5, 10, 100, etc. depending on the business logic that one wishes to apply to the specific situation where it is intended to realize this invention. The handshake process may or may not contain an instruction or order to be executed by the disconnected terminal (103), which depends on the business logic that one wishes to apply; in some cases the simple handshake process constitutes a confirmation of payment (for example, but not limited to, access to public transport), in others it may be necessary to send an instruction with additional data; in such case, follow step (424), where the electronic device (105) of the user (104) sends a command (901) and token (700) to a disconnected terminal (103), which (step (425)) receives the command (901) and the token (700), validates the token (step (426)) and executes the command (427), possibly using additional hardware (107). Some operations may have a duration, or continue until the user (104), using the electronic device (105) or some additional hardware interface (107), terminates it, a timeout occurs or the detection of an anomaly terminates a particular activity, for example when the disconnected terminals (103) are used (such as, but not limited to) in a system (106) for charging electrical vehicles, activating energy or water, renting bicycles, renting driverless vehicles, rides in playgrounds, lighting an area, etc., where prolonged use occurs, moments in time may occur where the active operation is saved/updated (step (428)) and there is a continuous return of status (429) between the disconnected terminal (103) and the electronic device (105) of the user (104) which receives the status and maintains a connection (step (430)). As there may be situations where there is only one handshake per se, registering as one operation, for example, but not limited to, a visit to the cinema or a use of public transport, as it may be necessary to send an instruction, for example, but not limited to, activating the electricity and water in a house for 4 days, but which does not accept or depend on additional actions of the user (104) to conclude the execution, and as the user may be able to (104) activate, exit, and return, and following a period of time, reconnect and terminate an activity. All of these situations depend on the business logic that one wishes to apply and which is not the scope of this document.

The formatted blocks (621) of operations (609) received by the electronic device (105) of the user (104) must be sent to the central server (101), as illustrated in step (431), where the electronic device (105) of the user (104), connects to the central server (101), presents credentials (900) and sends the formatted blocks (621) of operations (609) collected from all the disconnected terminals (103) where it made a connection, received a formatted block (621) of operations (609) and stored them in the database (801). The central server will validate the session (406) and place each block received from the electronic device (105) of the user (104) in a queue for processing (step (432)) sending a confirmation (step (433)) of receipt to the electronic device (105) of the user (104) who, after receiving this confirmation (step (434), deletes the blocks (435) in their local database (801).

FIG. 5 illustrates a computer system (500), where the embodiments of this invention, or parts thereof, can be implemented using an algorithm. For example, the central server (101), the disconnected terminal (103) and the electronic device (105) of the user (104) of FIG. 1 can be implemented in the computer system (500) using hardware, software, firmware, cloud computing or a combination thereof, and can be implemented in one or more computer systems or other processing systems. Hardware, software, or any combination thereof may incorporate modules and components used to implement the methods presented in this document. If an algorithm is used, this algorithm can run on a commercially available processing platform or on a device for special purposes. A person skilled in the art can perform the functions described here in various computer system configurations, including multi-core multiprocessor systems, minicomputers, cloud computing, mainframe computers, linked or grouped computers with distributed functions, mobile devices, as well as generalized or miniature computers that can be incorporated into virtually any device. For example, at least one processor device and one memory can be used to implement the embodiments described above. A processing unit or device as discussed here can be a single processor, a plurality of processors, or combinations thereof. Processing devices can have one or more processor cores. Several parts of this document are described in terms of this example of a computer system (500). After reading this description, it will become evident to an expert how to implement the present invention using other computer systems and/or computer architectures. Although the operations can be described as a sequential process, some of the operations can, in fact, be performed in parallel, simultaneously and/or in a distributed environment, and with program code stored locally or remotely for access by one or multiple processor machines. In addition to this, in some embodiments, the order of operations can be rearranged without deviating from the spirit of the subject matter revealed. The processor (501) may be one with a special purpose or a general-purpose processor device specifically configured to perform the functions discussed here. The processor device (501) may be connected to a communications infrastructure (503), such as a bus, message queue, network, multiple center message-passing scheme, etc. The network can be any suitable network for performing the functions hereby disclosed and may include a local area network (LAN), a wide area network (WAN), a wireless network (e.g. WiFi), a mobile communication network, a satellite network, the Internet, fiber optics, coaxial cable, infrared, radio frequency (RF) or any combination thereof. Other suitable network types and configurations will be obvious to experts from the field. The computer system (6500) may also include a main memory (504) (e.g. random-access memory, read-only memory, etc.) and may also include a secondary memory (505). The secondary memory (505) may include the hard disk drive (506) and a removable memory storage unit (507), such as a floppy disk drive, a magnetic tape drive, an optical disc drive, a flash memory, etc.

The removable storage drive (507) can read and/or write to the mobile storage unit (508). The mobile storage drive (508) can include a removable storage memory that can be read and written to the removable storage unit (507). For example, if the removable storage unit (507) is a floppy disk unit or universal serial bus port, the mobile storage unit (508) can be a floppy disc or portable flash unit respectively. In one embodiment, the mobile storage unit (508) can be a computer-readable recording medium or a cloud drive. In some embodiments, the secondary memory (505) may include alternative means to allow computer programs or other instructions to be uploaded to the computer system (500), for example, the removable storage unit (511) and an interface (509). Non-exhaustive examples of such means may include a cartridge interface and program cartridges (for example, as found in video game systems), a removable memory chip (for example, EPROM, ROM, SDCARD, etc.) and associated socket and other removable storage units (511) and interfaces (509) as will be obvious to experts from the field. The data stored in the computer system (500) (for example, in the main memory (504) and/or in the secondary memory (505)) can be stored on any type of computer-readable media such as optical storage (e.g. but not limited to, a CD, digital versatile disc, Blu-ray Disc, etc.), EPROM, ROM, removable memory chips, or magnetic tape storage (for example, a hard drive). The data can be configured in any form of appropriate database configuration, such as relational database, non-relational database, SQL database, distributed database, object database, etc.

Appropriate settings and storage types will be obvious to experts in the field. The computer system (500) may also include a communications interface (512). The communications interface (512) can be configured to allow software and data to be transferred between the computer system (500) and external devices. Examples of communications interfaces (512) may include, for example, without being limited to: a modem, a data network interface (for example, an Ethernet card, WiFi, Bluetooth), a communication port, a PCMCIA slot and card, etc. The software and data transferred through the communications interface (512) may be in the form of signals, which may be electrical, electromagnetic, optical or other signals. The signals can travel through a communications path (514), which can be configured to transport the signals and can be implemented using wires, cables, fiber optics, a telephone line, a cell phone link, a radio frequency link, etc., or using more than one medium. The computer system (500) can also include a display and interaction interface (502). The display and interaction interface enable the provision of an output to the user of the system and to receive input from the user of the system, and may be connected to additional hardware (515) for the display and/or collection of data. Computer programs (for example, computer control logic) can be stored in the main memory (504) and/or in the secondary memory (505). Computer programs can also be received through communications via the interface (512). Such computer programs, when executed, may allow the computer system to (500) implement the present methods, as discussed here. In particular, computer programs, when executed, may allow the processor device (501) to implement the methods documented in this document. Consequently, these computer programs may represent computer system controllers (500). Where the present invention is implemented using software, the software can be stored and loaded into the computer system (500) using the removable storage unit (502), interface (509, and hard disk drive (506), or communications interface (512). The processor device (501) may comprise one or more modules configured to perform computer system functions (500). Each of the modules can be implemented using hardware and, in some cases, can also use software, such as corresponds to the program code and/or programs stored in the main memory (504) or secondary memory (505). In such cases, the program code may be compiled by the processor device (501) before being run by the computer system hardware (500). For example, program code may be source code written in an interpreted programming language that is then executed on the processor (501) or programming language that runs on a virtual machine. The compilation process may include the use of lexical analysis, preprocessing, semantic analysis, code generation, code optimization, and any other techniques that may be appropriate for program code translation into a low-level language suitable for controlling the computer system (500) to execute the functions hereby revealed. It will be obvious to an expert in the field that such processes result in the computer system (500) being a computer system uniquely programmed to perform the functions discussed above.

FIG. 6.1 illustrates an operation (609) stored in the disconnected terminal (103); the operation is composed of data relating to the operation (607), with the minimum expectation of its comprising the following items: a unique identification code, the date and time that the operation was performed, and an identifying token code (700) used, and may include, depending on the business logic, a duration, end date and time of conclusion, unit of consumption, etc. and a hash (608) that will be explained below.

FIGS. 6.2 and 6.3 illustrate a table of operations (620) of the disconnected terminal in accordance with the illustrative materializations. A table of operations (620) is a table where the operations are listed (609). In the image an example is realized showing the collection of a sequential number representing the code of the operation (600), the date and time in Unix time when the operation was performed (601), the date and time in Unix time when the operation was terminated (602), the number of units provided (603), the identification code (604) of the token (700) used and the hash (605) of the operation. As can be seen in FIGS. 6.2 and 6.3, the table will have new operations added to the table as they are performed and operations are removed from the table when one of them is confirmed by the central server (301) and this information is transmitted to the disconnected terminal (103) via the electronic device (105) of the user (104).

FIG. 6.4 illustrates a flow chart of the operations chaining process in accordance with the exemplifying concretions. In this case we have several operations (609) chained in chronological form. These operations have their respective data (607), as explained above, which data passes through an algorithm that calculates a hash (612), and where this hash algorithm (612) has, as its input, the values comprising the data (607) of the operation (609) and the hash (608) calculated from the previous operation. As such, the operations are concatenated so that if there is any accidental or intentional modification of any value in the data of the operations before its arrival at the central server (103), this can be detected. There is a small exception when the hash operation (612) of the first block (609) is performed, because there is no previous block (609) and, so, there is no hash value (608) of the previous block (609). In this case, the hash function receives, as an input, the input data from the first block (609) and the value of the genesis hash (122) previously inserted into the disconnected terminal (103). The value of the genesis hash (122) is known to the disconnected terminal (103) and to the central server (101), and serves to make the system safer and more robust.

FIG. 6.5 illustrates a block of operations formatted to be sent from the disconnected terminal (103) to the central server (101) in accordance with the exemplifying realizations. The formatted block (621) of operations (609) includes a data structure (618) with all the operations (609) of the table (620) of operations (609) without the respective hashes (605), but with all the other minimum values (as previously presented and which may, depending on the business logic in the specific realization of this invention, contain other elements) and the signature (615) relating to the hash (608) of the most recent operation (609) as well as the identification code (619) of the disconnected terminal (103). The structure (619) only receives the operations (609) of the table (620) whose index value (740) known to the disconnected terminal (103) is greater (operations generated after the operation that gave rise to this index value). So only the operations whose index (740) known by the disconnected terminal (103) and validated by the central server (103), which are more recent than the operation that gave rise to the last index (740) confirmed on the central server (101) and informed to the disconnected terminal (103) are sent, in accordance with the procedure presented in this document. The formatted block (621) of operations (609) may include additional data (611), for example, but not limited to, operational information from the disconnected terminal (103).

FIG. 6.6 illustrates a flow chart of the most recent hash signature process (608) of the operation (609) for the disconnected terminal (103) in accordance with the exemplifying realizations. In this case the hash (608) calculated from the most recent operation undergoes a digital signature process (613) using the private key (120) of the disconnected terminal (120), resulting in a value (615) which is the signature. The choice of signing only the hash (608) of the last operation (609) was made in order to reduce the computational cost contemplating less powerful and simpler hardware. However, without altering the essence of this invention it is possible to sign the formatted block (621) of operations (609) using more or other elements from the same formatted block (621), thus ensuring that the validation process in the central server (101) is modified as well.

FIG. 6.7 illustrates a flow chart of the validity verification process of a token (700) by the disconnected terminal (103) in accordance with the exemplifying materializations. In this case, the token (700) undergoes a temporal validity check function (614), which is to say, if the date and time of validity (typically a Unix time, but other formats are allowed) is greater than the date and time of the clock module (312) of the disconnected terminal (103), if it is within the validity, then the data (701) of the token (700) undergoes a hash function (612) and then a signature verification function (617) which has, as input data, the hash of the data (701) of the token, the public key (119) of the central server (101) and the signature (710) generated in the central server (101). In some materializations the hash (707) of the token (700) can come previously computed from the central server (101), however, to reduce the amount of data trafficked this is omitted for optimization purposes.

FIG. 6.8 illustrates a flow chart of the validity check process of an index (740) by the disconnected terminal (103) which was transferred by the user (104) through the electronic device (105) thereof in accordance with the exemplifying realizations. In this case the value of the index (740) received from the user (104) undergoes a hash function (612) and then a signature verification function (617) which has, as input data, the hash of the index value (740), the public key (119) from the central server (101) and the signature (710) generated on the central server (101) and which was sent together with the index (740) by the user (104) via the electronic device (105) of the same. In some materializations, the index hash (740) can come previously computed from the central server (101), however, to reduce the amount of data trafficked, this is omitted for optimization purposes.

FIG. 7.1 illustrates the elements of a token (700) in accordance with the exemplifying materializations. The token (700) is composed of a set of values that compose its data (701), being, at the minimum, a unique identification code (704) and a date and time of validity (703), and may include other elements such as the date and time of creation among other data (705); and a signature (710) the process for obtaining which will be explained below.

In the example the date and time elements (702) and (703) are displayed in the Unix time format.

FIG. 7.2 illustrates a signature flow chart (710) of a token (700) by the central server (101) in accordance with the exemplifying materializations. The data of the token (701), undergo a hash function (612) generating a hash (707) of the token (700) that is given as an input in a signature function (613) together with the private key of the central server (118) resulting in the signature (710) of the token (700). FIG. 7.3 illustrates a flow chart of the processing of a formatted block (621) of operations (609) generated in the disconnected terminal (103) and processed by the central server (101) in accordance with the exemplifying materializations. The formatted block (621) of operations (609) is received by a function (718) that processes it and passes it on to a function (719) that checks in the database (201) the index value (740) of the last operation received, validated and processed on the central server (101) for the disconnected terminal that generated the block of operations (718) that is being processed.

These values are in the operations database (204) whose code (740) and hash (608) were recorded in the database (201) of disconnected terminals. If the last operation (609) in the formatted block (621) of operations (609) that are in the data structure (618) recorded chronologically already has a value less than the index value (740) recorded in the databases of the terminals (201) and operations (204), then the block is rejected (729). If it has a higher value, the function (720) will check if the other operations (609) in the data structure (618) have a value lower than the index (740) recorded in the databases of the terminals (201) and operations (204) of the central server for that specific disconnected terminal (103). If there are any, only those operations will be separated (724) whose index value (740) is larger than that registered on the central server (101) ignoring the operations (609) with a lower index value (740). Otherwise, all the operations will be analyzed. The operations undergo a function that checks in the database of the terminals (201) the hash (608) of the last operation (609) received, validated and processed by the central server (101) to the disconnected terminal (103) whose block is to be analyzed, sending this value to a function that reconstructs the hashes (727) of the operations (609) of the block received (718). Because the hashes are concatenated, and the operations are ordered chronologically, this step enables the data (607) from the operations (609) to be validated efficiently since an alteration to any value of the data (607) of the operations (609) will cause the computed hash to be different. There is an exception to this process, which occurs when the first data block of the disconnected terminal (103) is processed, in which case, there is no hash (608) from the last operation, using the genesis hash (122) in its place.

After calculating the hashes of all the operations (609) of the formatted block (621) of operations (609) received, the hash (608) is verified from the last operation (609) of the formatted block (621) of operations (609) under analysis (the most recent in chronological order) and undergoes a signature verification function (615) that also receives, as an input, the signature (615) that appears on the formatted block (621) received and the public key (121) of the disconnected terminal that generated the formatted block (621) received and that can be retrieved from the key database (202) (or disconnected terminals (201) depending on how it is implemented). If the signature is not valid the block is rejected (729); if the signature is valid, the block is validated (731), and the operations are added (732) to the operations database (204), and the index value of the last operation (609) of the formatted block (621) received (the most recent in chronological order) and its hash are updated in the database of the disconnected terminals (201) for the disconnected terminal (103) that generates the formatted block (621) analyzed.

FIG. 7.4 illustrates an index (740) signature flow chart (742) of the central server (101) in accordance with the exemplifying materializations. The index value (740), undergoes a hash function (612) generating a hash (741) of the index (740) that is given as an input in a signature function (613) together with the private key of the central server (118) resulting in the signature (742) of the index (740).

Figure 8:
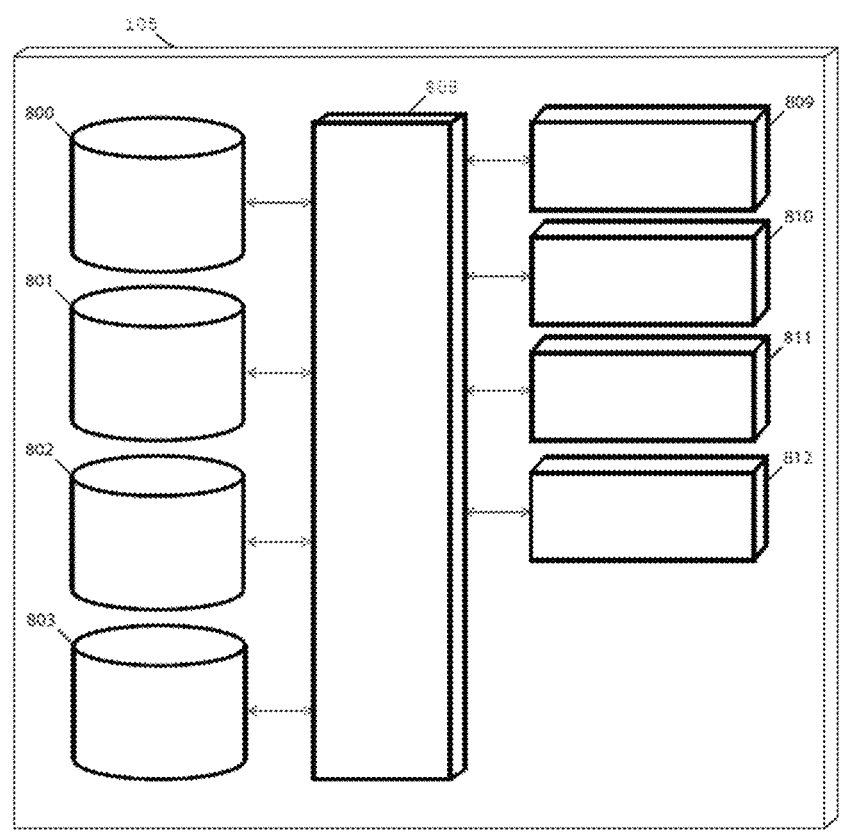
FIG. 8, is a block diagram illustrating the user's electronic device, also shown in FIG. 1.1, in accordance with exemplifying embodiments.

FIG. 8 illustrates an embodiment of the electronic device (105) of the user (104) of the system (100). The realization of the electronic device (105) of the user (104), will be obvious to those who have technical knowledge, with FIG. 8 being provided for illustrative purposes only and may not be exhaustive for all the configurative possibilities of the electronic device (105) of the user (104) to adequately execute the functions as presented here. The computer model depicted in FIG. 5, presented in greater detail below, may offer a more appropriate presentation of the electronic device (105) of the user (104).

The electronic device (105) of the user (104) may have a receiving unit (809). This receiving unit (809) may be configured to receive data over one or more data networks and through one or more network protocols. In some configurations the receiving unit (809) may be composed of multiple different units, for example to receive data from different networks. The receiving unit (809) can be configured to receive electronic data from the central server (101) or from the disconnected terminal (103), through a protocol.

The electronic device (105) of the user (104) may also include a communication module (808), where the communication module can be configured to transmit data between modules, engines, databases, memory and other components of the electronic device (105) of the user (104) in order to execute the inherent functions hereby discussed. The communication module (808) may consist of one or more types of communication and may use various methods of communication with computing devices. For example, the communication module (808), may comprise a bus, pin connector, wires, etc. In some materializations the communication module (808) may be configured for communication between internal and external components of the electronic device (105) of the user (104). The electronic device (105) of the user (104) may include a processing unit. The processing unit can be configured to perform inherent functions of the electronic device (105) of the user (104), which will be obvious to an expert. In some embodiments, the processing device may include and/or comprise a plurality of components and/or modules specially configured to perform one or more activities/functions of the equipment, for example, a user interface module (811) and a graphic interface module (812), etc. As used here, the term "module" means software, hardware or a mixture of both specifically programmed to receive a data input, perform one or several processes using the data received, and which may collect more data from the other system components and provide a data output. The input, output and processes executed by the various modules will be easy to understand and implement for an expert based on this document.

The electronic device (105) of the user (104), may include a database of: tokens (800), blocks of operations (801) and terminals (802) that are created in a suitable data storage format and schema. These databases (800), (801) and (802) may be relational or non-relational databases (which use a query language for all reading, searching, adding, modifying, updating, accessing, guarding processes, etc.), sets of data structures stored in volatile or non-volatile memory, cloud data structures, etc.

The token database (800) serves to save tokens (700) issued by the central server (101) and must consist of elements capable of saving the tokens (700) in the form in which they are issued. The operations block database (301) may be configured to save a data structure that serves to save the formatted blocks (621) of operations (609) generated by the disconnected terminals (103) to be transmitted in turn to the central server (101). The terminal database (802) contains the indices (740) and respective signature (742) of the last operation (609) received, validated and confirmed by the central server (101) for each respective disconnected terminal (103) and the respective identifier code of the terminal.

The electronic device (105) of the user (104) may have a transmission unit (810). This transmission unit (810) may be configured to receive data over one or more data networks, and through one or more network protocols. In some configurations the transmission unit (810) may be composed of multiple, different units, for example to receive data from different networks. The transmission unit (810) may be configured to receive electronic data from the central server (101) or from the disconnected terminals (103), through a protocol. The electronic device (105) of the user (104) possesses a memory (802).

FIGS. 9.1, 9.2 and 9.3, are flow charts illustrating the post-paid process and system for multipurpose disconnected terminals, using the system (100) shown in FIG. 1.1, in accordance with the forms of exemplifying realization. In FIG. 9.1 the user (104), using the electronic device (105), connects to the central server (101). The connection between the electronic device (105) and the central server (101) is achieved by any electronic data network that allows a connection between the two computer systems through a protocol. After establishing the connection, the electronic device (105) of the client (104) may, at least, send its credentials (900) to the central server (101) (the credentials may be a session token, a combination of user name and password, or another technique that allows for the unequivocal identification of a user by the computer system of the central server (101)), thus authenticating it. In the typical realization hereby presented, a login is made using a combination of the user code/password (900) and then the central server (101) sends back a session token (900) that will be used in substitution of the user code/password pair as authentication data before the central server (101), requesting one or more tokens (700) and index data (903) of the disconnected terminals (103). The central server (101) can use the connection established with the electronic device (105) of the user (104) to, at least, send back one or more tokens (700) that identify the user (104) in the disconnected terminals (103) inserted into a certain system (106) in accordance with the business logic to be implemented in the specific case, and send back index data (903) of all the disconnected terminals (103), from a set of disconnected terminals (103) or just one disconnected terminal (103), in accordance with the business logic that one wishes to implement for the specific situations where one intends to use this invention. The index data (903) are composed of at least three elements: the identification code (619) of the disconnected terminal (103), the index value (740) of the last operation (609) received, validated and confirmed by the central server (103) and the validation signature (742) generated by the central server (103) using the private key (118) of the central server (103). As can be perceived in FIGS. 9.1, 9.2 and 9.3, the electronic device (105) of the user (104) does not need to be connected at the same time to the central server (101) and to the disconnected terminal (103). Although there is no limitation if this happens, the spirit of this invention is that there is no way that the present invention would work if this happened. In FIG. 9.2 the user (104), using the electronic device (105), connects to the disconnected terminal (103). The connection between the electronic device (105) and the disconnected terminal (103) is achieved using any electronic data network that allows a connection between the two computer systems through a protocol, for example, but not limited to, Bluetooth, WiFi, IoT, NFC, Radio, Wimax, infrared, etc. During this connection the electronic device (105) of the user (104) can at least send the index data (903) of the respective disconnected terminal (103), the token (700) that identifies it to the disconnected terminal (103) and/or commands (901). Similarly, the disconnected terminal (103) can use the connection with the electronic device, at least, to send to the electronic device (105) of the user (104) the formatted block (621) of operations (609) performed and a status (902). The commands (901) of the electronic device (105) of the user (104) are optional in some scenarios and necessary in others, and depend on the specific solution that it is wished to implement using the present invention as a basis. For example, but not limited to, in a system for loading electric vehicles, it may be required to give a command with the time or amount of kilowatts that you wish to charge into the vehicle, and it may also be necessary to send a command to stop the charging process before the quantity of kilowatts or set time has been reached. In such circumstances, it is necessary to send commands (901). However, in other circumstances, for example, but not limited to, the admission of entry into an events space or the use of public transport, there may be no need to send a command because the process of connecting and sending the token presupposes a payment activity where the additional hardware (107) triggers the process of opening a door or barrier. The additional hardware itself (107) may have an interaction interface that can execute a command: for example, but not limited to, stopping a continued action, for example, but not limited to, stopping the power supply to an electric vehicle, where the amount of energy supplied is measured by the additional hardware and increased in the active operation (609) which, after being concluded, is added to the block of operations (620). Another example, though not a limiting one, is entry into a parking lot where an operation (609) is opened, and on exiting, the operation (609) is closed and the length of stay is recorded. So, many materializations are possible using this invention as a basis.

In FIG. 9.3, an addition to FIGS. 9.1 and 9.2 is illustrated, detailing the sending of formatted blocks (621) of operations (609) from several disconnected terminals (103) where the electronic device (105) of the user (104) was previously connected and received the formatted blocks (621) of operations (609) which now send them to the central server (101) for processing as previously described in this document. After sending the formatted blocks (621) of operations (609) the server may respond by returning a status enabling the electronic device (105) of the user (104) to know that the blocks were correctly received and that it can, thus, remove them from its database (801). The hash, signature and validation processes hereby presented, namely in FIGS. 4, 6.4, 6.6, 6.7, 6.8, 7.2, 7.3 and 7.4, can be performed using all the mandatory data, mandatory and optional data, only one or more of the mandatory/optional data elements, as well as by inserting data inputs that do not come directly from the elements that will be passed through the hash or signature, such as the inclusion of a password or salt. The hash function may be any one (and more than one) that the expert in the field may choose in the specific materialization of this invention, and who may use, for example, but without being limited to, MD5, MD6, RIPEMD, RIPEMD-128, RIPEMD-160, RIPEMD-320, SHA-1, SHA-224, SHA-256, SHA-384, SHA-512, SHA-3, Skein, Snefru, Spectral, Streebog, SWIFFT, Tiger, Whirlpool, One-key MAC, MD6, HMAC, etc.

The signature and/or validation function may be any one (and more than one) that the expert in the field may choose in the specific materialization of this invention, its being possible to use, for example, but not being limited to, RSA, RSA-PSS, DSA, ECDSA, Ed25519, ElGamal, etc.

There may be a configurable limit on operations (609) that can be saved in the operations table (620) without causing the disconnected terminal (103) to stop accepting new operations until you receive a new index (903) from the central server (101).

Its not being part of the scope of this document, since it concerns a specific realization dependent on the business logic that one wishes to implement with this invention, the billing process may use a third-party billing platform where the data of the operations are sent together with the user information to the billing process; and a system of precharged credits may also be implemented which are billed as the operations are validated.

Descriptions of Preferred Embodiments

A charge points solution for electric vehicles. In this realization the disconnected terminal is inserted inside an electric vehicle charger located in a particular garage. This solution is particularly useful in condominium situations where the garage is shared and the electrical network is paid for by everyone, and it is intended that whoever charges a vehicle pays for the energy it consumes. In this case the user, using a cell phone that runs a specific application designed for the solution in question, is authenticated in the server in order to provide the energy contract number that it has with a given vendor. On performing the registration and authentication, it receives a token with a validity of 72 hours, which allows it to charge the vehicle at any electric vehicle charger in the network, where the cost of the energy consumed will be added to its household electrical bill in accordance with the kilowatts rate that it normally pays. On parking the electric vehicle near a charging point, it only has to run the specific application created for the purpose, which already possesses the token, scan a qrcode with the information for the Bluetooth connection with the charging point and select the charge for a period of time or quantity of kilowatts. After activating the charge point, one simply has to connect the car's electric cable to the charger and await the charging process. Using his mobile phone, the user can stop the charging process if he wishes to remove the car before the full charge is concluded. The charge point possesses an electrical counter that calculates the amount of energy consumed, and, following the conclusion of the operation, it records it in the operations table. When one (or the same) user reconnects to the charge point it will receive the operations table, with this operation, and when it is connected to the Internet, the application sends the table back to the server and can request a new token. The server can deduct the consumption of preloaded credits or send the customer's operations and data to any third-party platform that executes the billing process by direct debit or by sending the consumption to the customer for payment. This solution is particularly useful as many garages have weak or nonexistent mobile networks.

A solution for garages. In this realization, the disconnected terminals are coupled to the access barriers of the garage. Using a specific application, and either the Bluetooth or NFC of his cell phone, the user opens the access to the garage, which initiates the calculation of the time. When the user exits, again using the Bluetooth or the NFC of his phone, on opening the barriers to exit, he closes the operation which is recorded in a block of operations. The blocks of operations are only sent to the customers' mobile phones following every 50 operations opened.

A solution for electricity or water for holiday homes. In this realization, the disconnected terminals are coupled to the water and/or electricity meters of a holiday home, which possesses a control for cutting off the water/electricity supply. Using a specific application, when he arrives at the rented house, the client connects to the disconnected terminal and activates the electricity and water of the house which will be calculated during the period he stays in the house (he has the option to set the time in days, for example, or disconnect when he wishes). When his stay ends, he simply turns off the lights and the operation block is transferred to the mobile phone so that it can be billed in accordance with the amount of water and/or electricity used.

The technical information hereby presented provides, among other features, A POST-PAID PROCESS and SYSTEM FOR MULTIPURPOSE DISCONNECTED TERMINALS. Although several forms of illustrative realization of the system have been described above, it should be understood that they were presented for exemplifying purposes, without limitations. They are not exhaustive and do not limit the invention to the precise forms disclosed. Modifications and variations are possible depending on the technique adopted and intention of the user.

The invention claimed is:

1. A method for performing operations on disconnected multipurpose terminals for post-paid payments comprising the electronic device establishing an electronic connection to the central server via at least one data network, and the disconnected terminal establishing an electronic connection to at least one data network via the user's electronic device, wherein the control and command module controls and communicates with the hardware of the said disconnected terminal, in response to a instructions sent by the user through said electronic device and after the validation of the token mandatorily sent;

the hash generating for each operation performed in the disconnected terminal comprises the input data related with the elements/values that compose the operation; computing the value of the hash in the immediately preceding operation, allowing to create a structure of chained hashes of operations, where, in the first operation, a predetermined configured genesis hash value is used in the disconnected terminal and is also registered on the central server;

the cryptographic keys validating the messages exchanged between the central server and disconnected terminals via the user's electronic device;

the queue module managing the queuing of all the blocks received from the users through their electronic devices to be validated by the validation module;

the token-validation module validating the tokens generated on the central server by the token generation module, verifying that the expiration date is still valid and whether the signature generated is valid;

the index generation module generating an index that informs the disconnected terminal which operation performed on it has already been received, validated and processed in the central server;

the index validation module validating the index generated on the central server by the index generation module, which informs the disconnected terminal which operation performed on it was already received, validated and processed by the central server;

the block generation module generating a block of operations that have not yet been received, validated and processed by the central server, whose index value is greater than the index value of the operation that the disconnected terminal knows as having been received, validated and processed by the central server;

the user's electronic device storing the tokens generated on the central server for use in the disconnected terminals; storing the indices generated on the central server of the operations of the disconnected terminals that have already been received, validated and processed on the central server, so that these indices can be sent to the disconnected terminals; and storing the blocks of operations generated by the disconnected terminals to be sent to the central server for processing and validation;

adding the genesis hash to the disconnected terminal, and that is known by the central server, to be used in the creation of the hash of the first operation, since, given that it is the first operation, there is no previous operation whose hash can be used for the concatenation of the hashes;

the concatenated hash is characterized b y the way the operations are organized in the disconnected terminal where, for each operation, calculating a hash based on its data and the value of the calculated hash of the previous operation, where, as such, any minimal change in the data of any operation changes the value of the final hash;

the central server receiving an electronic connection via a data network with the user's electronic device so that it may authenticate access, request tokens, list indices and send blocks of operations received from the disconnected terminals, where the central server, in one of its realizations, may consist of a token generation module, a clock module, an cryptography module, an index generation module, a block validation module, a queue module and an authentication module; and may have the following databases of: users, disconnected terminals, cryptographic keys, tokens generated, and operations received; and the disconnected terminal receiving a electronic connection via a data network with the user's electronic device to receive the index value, token, order of execution and transmit the block of operations to be sent subsequently to the central server, where the disconnected terminal in one of its realizations may consist of a token validation module, a clock module, a cryptography module, a block generation module, an index validation module, and a control and command module; and where it may have the following databases: operations and cryptographic keys.

* * * * *